J. MEIER.
COTTON PICKING MACHINE.
APPLICATION FILED MAY 9, 1914.
1,135,202.
Patented Apr. 13, 1915.
3 SHEETS—SHEET 1.
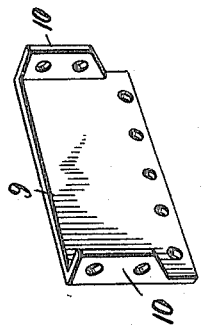
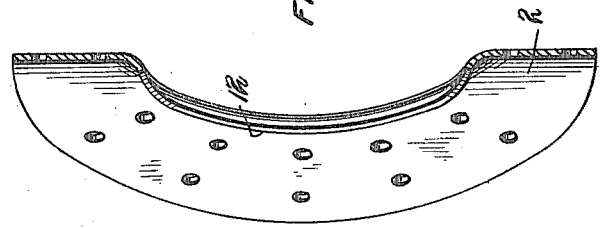
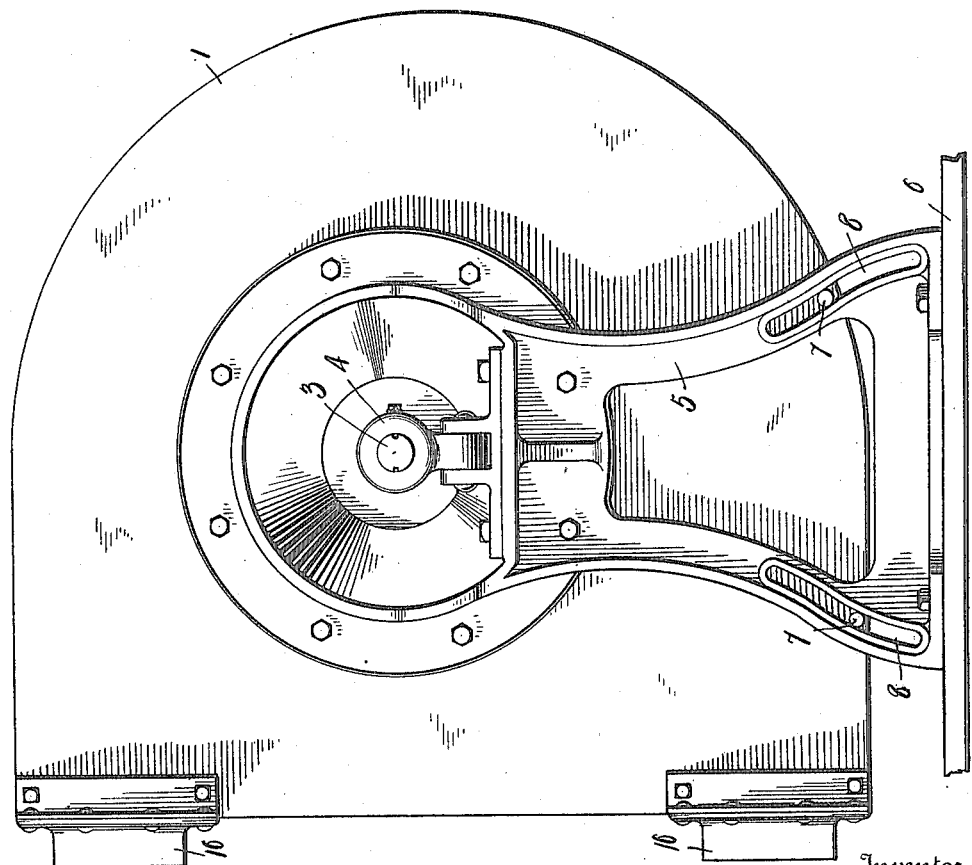

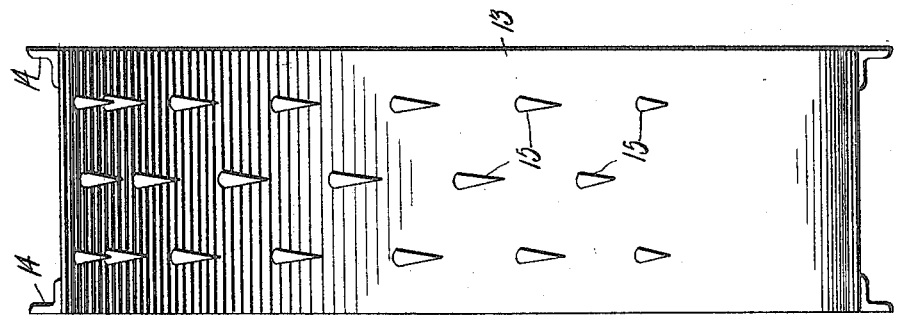
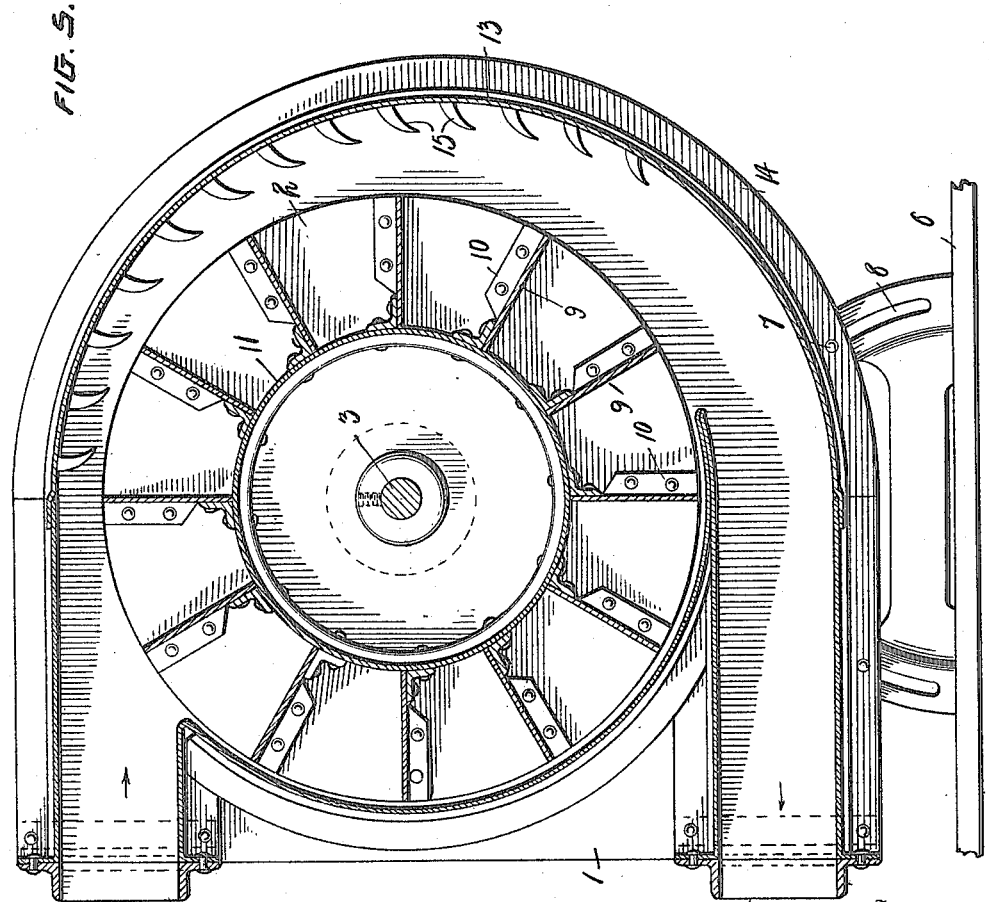

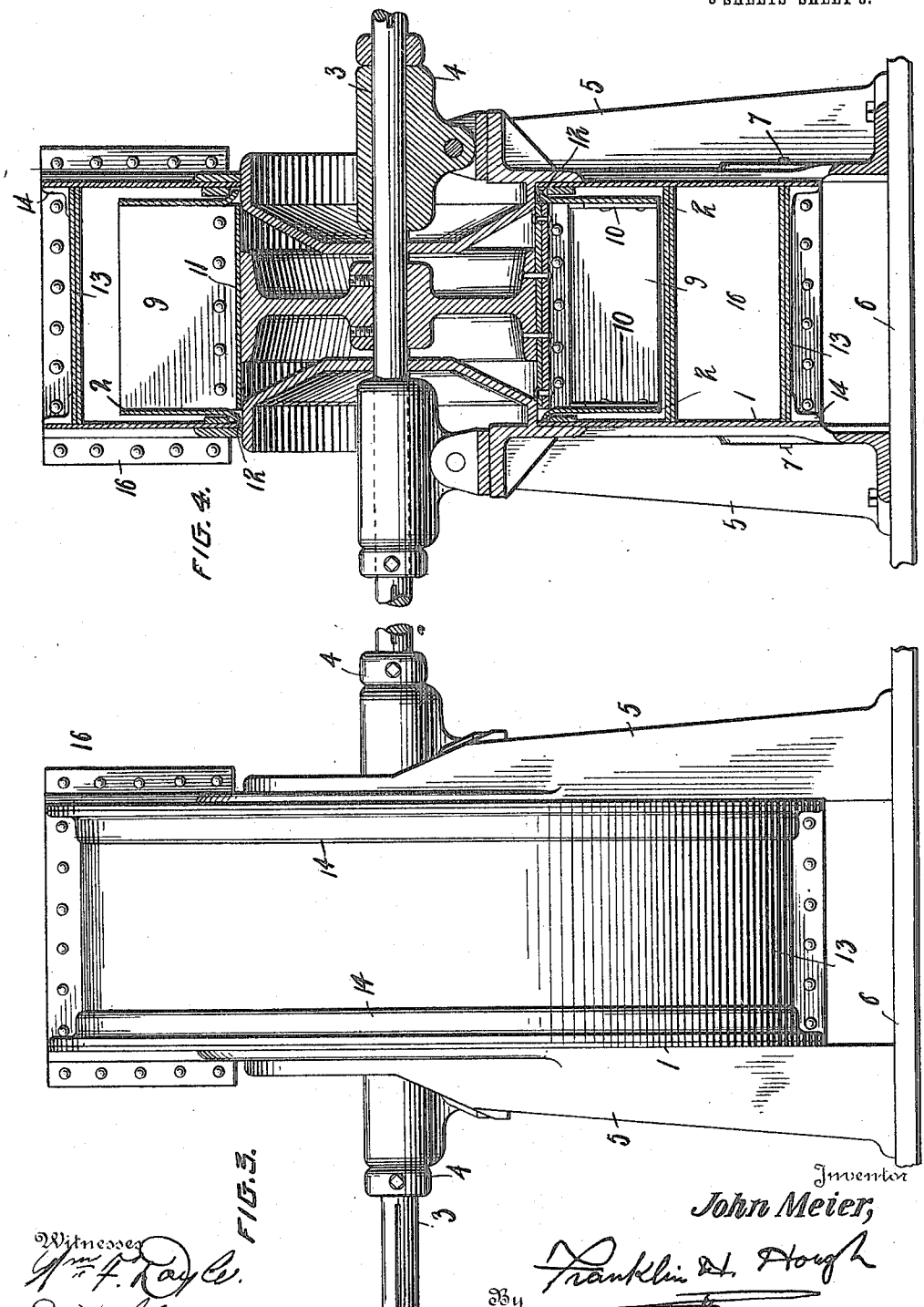

UNITED STATES PATENT OFFICE.

JOHN MEIER, OF DALLAS, TEXAS, ASSIGNOR OF ONE-TWENTIETH TO FRANK RICHARD AND ONE-TWENTIETH TO FRANK PEYROT, BOTH OF CHICAGO, ILLINOIS.

COTTON-PICKING MACHINE.

1,135,202.

Specification of Letters Patent.

Patented Apr. 13, 1915.

Application filed May 9, 1914. Serial No. 837,496.

*To all whom it may concern:*

Be it known that I, JOHN MEIER, a citizen of the United States, residing at Dallas, in the county of Dallas and State of Texas, have invented certain new and useful Improvements in Cotton-Picking Machines; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in cotton picking machines and it relates more particularly to that class of machines in which the picking is accomplished by suction produced by a rotary fan and it has for its object, among others, the provision of a machine of this character in which the cotton is received within the casing or fan chamber at a point above the point at which it is discharged.

The invention relates further to pneumatic suction fans for use in cotton picking machines and comprising means whereby the cotton and the seed as they are picked from the boll of the plant may be forcibly drawn through a casing without any danger of injuring the cotton or seed.

Another and an essential feature of the present invention consists in the provision of a casing having inlet and exit passageways leading thereto with a fan mounted eccentrically within the casing and so arranged that the size of the passageway through the casing will increase in width from the inlet to the exit ends thereof, thus reducing to a minimum the obstructions for the passage of the cotton as it passes through the casing.

A further and essential object of the invention resides in the provision of a machine of the character described in which the peripheral inner wall of the fan casing is provided throughout a portion of its distance with baffle pegs or projections extending inwardly and inclined slightly downward, the object of such pegs being to jar or break the bolls, thus permitting the escape therefrom of cotton which would otherwise be wasted.

To these ends and to such others as the invention may pertain, the same consists in the novel construction and in the peculiar arrangement, combination and adaptation of parts, all as will be more fully hereinafter described, shown in the accompanying drawings and then specifically defined in the appended claim.

The invention is clearly illustrated in the accompanying drawings, which, with the numerals of reference marked thereon, form a part of this specification and in which drawings: Figure 1 is a side elevation of a cotton picking machine constructed in accordance with my invention. Fig. 2 is a central vertical section of the same. Fig. 3 is an edge view. Fig. 4 is a vertical transverse section of the machine. Fig. 5 is a detail view of the inside of the segmental plate carrying the baffle pegs. Fig. 6 is a detail in perspective of one of the fan plates, and Fig. 7 is a sectional perspective view of one of the side plates of the fan.

Reference now being had to the details of the drawings by numeral, 1 represents the fan chamber within which is provided a fan wheel 2 pivoted upon a central shaft 3, the ends of which shaft are suitably journaled within journal boxes 4 carried by a suitable supporting frame 5, the lower portion of which supporting frame is securely bolted to the floor 6 of the vehicle upon which the machine is mounted. Means are provided for the tilting of the chamber by the engagement of horizontal pins or projections 7 which extend outwardly from the lower edge of the side walls of the fan box and may engage elongated slots 8, provided in the legs or lower portion of the fan supporting frame. The fan wheel is provided with radially disposed blades, each blade consisting of a metallic plate having its outer end 10 bent at right angles to the body of the plate, as shown clearly in Fig. 5 of the drawings. This plate is securely bolted at its lower edge to the collar or cylindrical portion 11 of the fan and to the outwardly extending flanged ends 10 of the plate are bolted the side plates 12.

Within the outer curved peripheral wall of the chamber 1 is provided a curved sectional plate 13, the said plate being held in place within the chamber by attachment to the curved angle irons 14 and the plate is provided with a series of curved and downwardly inclined baffle pegs or projections 15, these pegs being secured to the plate in any suitable manner as, for instance, by engagement of the screw threaded shank at the lower end with the screw threaded openings formed in the plate, or they can be attached in any other suitable manner. The plates 13 are detachable and interchangeable so that plates having baffle pegs of a size suitable for the particular kind of work or class of work being operated upon can be used and, under varying conditions, the plate can at any time be removed and another plate having pegs best adapted to the use for which the machine is designed can be substituted therefor with the view of rendering the machine at all times best adapted to the character of cotton or other conditions that may prevail.

While I have in the drawings shown a fan casing of substantially semi-circular form, it will at once be evident that the particular form or design of the casing may be varied without departing from the spirit of the invention.

From the foregoing description, the operation of the machine will be at once evident. The machine is designed for use in connection with a suitable picking nozzle in the use of which the boll with its inclosed cotton is separated from the plant and is, by the suction produced by the fan, carried within the interior of the fan chamber, entering the fan chamber at the intake entrance 16 and passing around the outer portion of the chamber to the discharge point 17 from which point it is conveyed through a conveyer spout, not shown.

The cotton bolls upon being received within the chamber are at once thrown outward where they contact with the baffle pegs 15 and their violent contact with the pegs serves to jar and break up the bolls, thus releasing the cotton contained therein, which cotton thus released is at once carried by suction produced by the fan out at the discharge point of the casing in advance of the burs, which follow to a point outside of the casing where an opening is provided through which they escape by gravity.

It will be noted by the construction herein shown, whereby provision is had for the reception of the cotton at the upper portion of the casing and its discharge in the lower edge, that advantage is taken of the force of gravity in aiding the movement of the cotton through the casing. It will also be noted that, by the provision whereby the cotton bolls are broken in their transit through the chamber, there is a saving effected not only in the cotton which would otherwise be wasted but also in the cotton seed remaining within the boll after the cotton has been removed.

Having thus described my invention, what I claim to be new and desire to secure by Letters Patent is:—

A cotton boll opener and picker comprising a casing having a free inlet opening and a free outlet opening, one vertically above the other, a cylinder mounted to rotate in said casing, having flanges at the ends thereof and fan blades between the flanges forming pockets, a detachable concave forming one side of the casing, teeth on the concave against and along which the cotton bolls are adapted to be forced by the fan, the cylinder being located eccentrically to the concave whereby the teeth near the inlet are nearer the fan blades than the teeth near the outlet.

In testimony whereof I hereunto affix my signature in presence of two witnesses.

JOHN MEIER.

Witnesses:
 A. R. FOWLER,
 FRANKLIN H. HOUGH.

Copies of this patent may be obtained for five cents each, by addressing the "Commissioner of Patents, Washington, D. C."